Patented Mar. 4, 1941

2,233,620

UNITED STATES PATENT OFFICE 2,233,620

PROCESS FOR IMPROVING THE THERMAL STABILITY OF NITROPARAFFINS

Samuel B. Lippincott, Terre Haute, Ind., assignor to Commercial Solvents Corporation, Terre Haute, Ind., a corporation of Maryland No Drawing. Application October 9, 1939, Serial No. 298,713

11 Claims. (Cl. 202—57)

My invention relates to the heat stabilization of crude nitroparaffins, and more specifically to the stabilization of crude nitroparaffins against thermal decomposition under conditions encountered in the distillation of such nitroparaffins.

The nitroparaffins can be produced by the direct vapor phase nitration of paraffin hydrocarbons, as, for example, in accordance with the processes described in U. S. Patents 1,967,667 of H. B. Hass et al., 2,071,122 of H. B. Hass et al., 2,161,475 of G. K. Landon, and 2,164,774 of G. K. Landon. The crude nitroparaffins, obtained by such processes, are commonly purified by distillation, and in the case of nitration products from hydrocarbons containing more than one carbon atom, the mixed nitroparaffins obtained are separated by fractional distillation.

In attempting to distil the crude nitrated products at atmospheric pressure, thermal decomposition is encountered, and a colored distillate is obtained. This thermal decomposition appears to be accelerated by certain materials with which the nitrated products may be in contact. Thus, worse decomposition is encountered in stainless steel apparatus than in glass, and still worse in aluminum apparatus. This thermal decomposition can be reduced to some extent by preliminary steam distillation of the crude product, and can be further reduced by effecting the final distillation or fractionation under reduced pressure, and hence at a lower temperature. However, reduced pressure operation is more expensive, and requires larger apparatus for a given volume of material distilled, and is hence undesirable from a commercial standpoint.

The purified nitroparaffins obtained by fractional distillation are also subject to thermal decomposition, although to a considerably less degree than the crude nitroparaffins. Here, again, it is usually disadvantageous to have to resort to reduced pressure in an attempt to minimize the decomposition.

I have now discovered that the thermal stability of the nitroparaffins can be materially improved by incorporating therewith small amounts of boric acid, or certain other boric acid compounds. The compounds which I have found to be effective for this purpose comprise orthoboric acid, the various polyboric acids (Mellor, Inorganic and Theoretical Chemistry, vol. V, p. 47) boric anhydride, the easily hydrolyzable esters of boric acid, as, for example, ethyl borate, propyl borate, and butyl borate, and the easily hydrolyzable boric acid salts of amphoteric metals, as, for example, aluminum borate, zinc borate, and lead borate.

All of the boric acid compounds of the class described above are effective in improving substantially the thermal stability of the nitroparaffins. Although an improvement is effected in every case, it may not be sufficient to permanently prevent thermal decomposition, especially if the nitroparaffin is in contact with a metal which tends to accelerate decomposition reactions. Also, the various stabilizing agents of this class differ to some extent in the degree of their effectiveness. Thus, boric acid, boric anhydride, aluminum borate, zinc borate, and ethyl borate are sufficiently effective to enable steam-distilled crude nitroparaffins to be fractionally distilled over a distillation cycle of 180 hours in glass or stainless steel apparatus, without any apparent thermal decomposition. On the other hand, lead borate and butyl borate effectively prevent thermal decomposition during atmospheric pressure distillation for a somewhat shorter period of time. These latter compounds, however, are effective over longer periods of time at somewhat reduced pressure, and in any case the utilization of one of these stabilizing agents will enable distillation to be carried out at a higher pressure, i. e., at a higher temperature, without any thermal decomposition than would be possible in the absence of such compound.

The amount of stabilizing agent to be employed may vary over a considerable range, but I prefer in general to employ from 0.1–1.0% based on the weight of the nitroparaffins. Smaller amounts may be effective in some cases, and considerably increased amounts may be employed without any harmful effects. The minimum amount for complete stabilization, under the conditions to be encountered, may of course be determined by preliminary experiments.

The stabilizing agent may simply be added to the nitroparaffins which are to be subjected to elevated temperatures. For simple batch distillation, the material may be added to the nitroparaffins in the distillation vessel, and for continuous distillation the stabilizing agent may be added continuously to the feed. In the case of fractional distillation, it is desirable that the liquid nitroparaffins in the fractionating column be in contact with the stabilizing agent, and to effect this end the stabilizing agent can be continuously added to the reflux entering the top of the column, as well as being introduced into the material in the kettle or into the feed in a continuous fractionation.

The continuous introduction of the stabilizing agent can be carried out by any suitable mechanical means. Liquid stabilizing agents, such as ethyl borate, may be directly introduced into the feed, or reflux, by means of suitable valve control, or a proportionating pump. A solid stabilizing agent, such as boric acid or boric anhydride, may be continuously introduced by passing the feed or reflux through the solid material, the amount dissolved being controlled by the temperature of the liquid nitroparaffins being passed through the solid material. A wire mesh basket inserted in a suitable vessel in the reflux or feed lines, will satisfactorily serve this purpose. Other equivalent means of introducing the stabilizing agents will of course be apparent to those skilled in the art.

My invention may further be illustrated by the following specific examples:

Example I

The crude nitroparaffins obtained by the nitration of propane were steam distilled, and the steam distillate was separated by decantation. The oily layer, constituting the crude steam distilled nitroparaffins, was charged into a distillation vessel equipped with a column packed with stainless steel helices, approximating in efficiency a 20-plate bubble-cap column. 1% by weight of boric acid was added to the nitroparaffins, which were then fractionally distilled to separate low boiling impurities and to obtain, as purified products, nitromethane, nitroethane, 1-nitropropane, and 2-nitropropane. The distillation required 180 hours, and no thermal decomposition was encountered.

In a similar distillation, without any stabilizing agent, the distillate at the end of 15 hours was distinctly colored as a result of thermal decomposition.

Example II

Crude nitroparaffins from the nitration of propane after removal of low-boiling impurities, were steam distilled and the distillate separated by decantation. The oily layer, comprising nitromethane, nitroethane, 1-nitropropane, and 2-nitropropane, was introduced continuously into an intermediate plate of an 80-plate stainless steel bubble-cap rectifying column. The feed was pre-heated to approximately 80° C., and passed through a wire basket containing fused boric acid (approximate formula—$H_2B_2O_4$, metaboric acid). A portion of the material taken off at the bottom of the column was vaporized and vapor introduced above the first plate of the column to supply the necessary heat for the distillation. The column was operated at a reflux ratio of approximately 40 : 1, and the reflux condensate was preheated to 80° C., and passed through a wire basket containing fused boric acid prior to introducing the condensate into the top plate of the column. The column was operated continuously for a period of 190 hours, pure nitromethane being removed from the top of the column, and a residue of nitroethane, 1-nitropropane and 2-nitropropane being removed from the bottom of the column. The average contact time in the column was in excess of 11 hours. The distillate was water-white throughout the entire distillation, indicating formation of no volatile products of thermal decomposition. The material removed from the bottom of the column, containing dissolved boric acid, was batch distilled for a period in excess of 190 hours to obtain nitroethane, 1-nitropropane, and 2-nitropropane as separate fractions. No thermal decomposition was encountered, and these fractions were obtained as water-white distillates.

Example III

Nitroethane was obtained from the crude nitroparaffins from the nitration of propane, by a double fractionation process. These fractionations were effected in a manner similar to the above examples, employing boric acid during the distillations, and the nitroethane was obtained as a water-white distillate having a narrow boiling range indicating a substantially pure product. On attempting to refractionate this purified nitroethane, utilizing the still described in Example I, the distillate became colored after five hours of operation without the use of any boric acid compound. However, purified nitroethane was successfully re-fractionated in this equipment when approximately 1% by weight of boric acid was added to the initial charge in the distillation vessel. In this case the distillation required 163 hours and was completed without any discoloration of the distillate or any other evidence of thermal decomposition.

It is to be understood, of course, that the above examples are merely illustrative and do not limit the scope of my invention. Although my invention has particular utility in the prevention of thermal decomposition during distillation of nitroparaffins, it is also applicable to other uses in which nitroparaffins are subjected to elevated temperatures. Likewise, my invention is not to be construed as limited to the particular stabilizing agents or nitroparaffins employed in the above examples. Any of the boric acid compounds of the class previously described may be utilized as stabilizing agents, and these agents may be employed to improve the thermal stability of any of the nitroparaffins. In general, it may be said that the use of any equivalents, or modifications of procedure, which would naturally occur to those skilled in the art, is included in the scope of my invention.

My invention now having been described, what I claim is:

1. A process for improving the thermal stability of nitroparaffins, which comprises incorporating therewith a boric acid compound of the class consisting of orthoboric acid, the polyboric acids, boric anhydride, the easily-hydrolyzable esters of boric acid, and the easily-hydrolyzable boric acid salts of the amphoteric metals.

2. A process for improving the thermal stability of nitroparaffins, which comprises incorporating therewith a boric acid.

3. A process for improving the thermal stability of nitroparaffins, which comprises incorporating therewith metaboric acid.

4. A process for improving the thermal stability of nitroparaffins, which comprises incorporating therewith aluminum borate.

5. A process for improving the thermal stability of nitroparaffins, which comprises incorporating therewith zinc borate.

6. In a process for the purification of crude nitroparaffins, by distillation the step which comprises adding to said crude nitroparaffins a boric acid compound of the class consisting of orthoboric acid, the polyboric acids, boric anhydride, the easily-hydrolyzable esters of boric acid, and the easily-hydrolyzable boric acid salts of the amphoteric metals.

7. In a process for the purification of crude nitroparaffins, by steam distilling said nitroparaffins and subsequently distilling the resultant steam-distilled nitroparaffins, the step which comprises adding a boric acid compound of the class consisting of orthoboric acid, the polyboric acids, boric anhydride, the easily-hydrolyzable esters of boric acid, and the easily-hydrolyzable boric acid salts of the amphoteric metals.

8. In a process for the purification of crude nitroparaffins, by steam distilling said nitroparaffins and subsequently distilling the resultant steam-distilled nitroparafins, the step which comprises adding a boric acid thereto.

9. In a process for the purification of crude nitroparaffins, by steam distilling said nitroparaffins, and subsequently distilling the resultant steam-distilled nitroparaffins, the step which comprises adding meta-boric acid thereto.

10. In a process for the purification of crude nitroparaffins, by steam distilling said nitroparaffins, and subsequently distilling the resultant steam-distilled nitroparaffins, the step which comprises adding aluminum borate thereto.

11. In a process for the purification of crude nitroparaffins, by steam distilling said nitroparaffins, and subsequently distilling the resultant steam-distilled nitroparaffins, the step which comprises adding zinc borate thereto.

SAMUEL B. LIPPINCOTT.